Feb. 15, 1938. C. B. DREYER 2,108,284
METHOD OF PRODUCING PHOTOGRAPHIC EFFECTS AND FILMS THEREFOR
Filed April 2, 1934
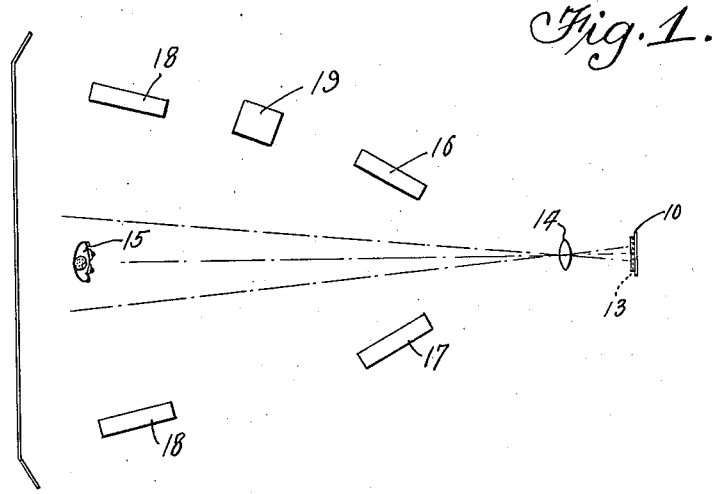
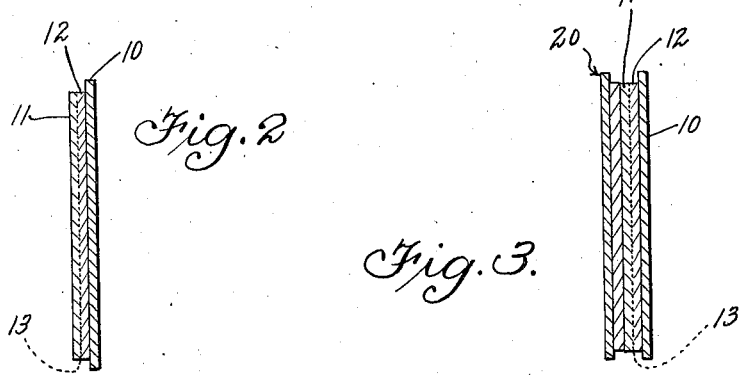
Inventor
Charles B. Dreyer
By Lyon & Lyon
Attorneys Patented Feb. 15, 1938

2,108,284

UNITED STATES PATENT OFFICE 2,108,284

METHOD OF PRODUCING PHOTOGRAPHIC EFFECTS AND FILMS THEREFOR

Charles B. Dreyer, Los Angeles, Calif., assignor of one-half to Henry F. Boeger, Los Angeles, Calif.

Application April 2, 1934, Serial No. 718,559

2 Claims. (Cl. 95—9)

This invention relates to a method of producing monochromatic cinematographic films which contain images of objects photographed in such relation that an effect of relief, depth, or of unusual definition is obtained. By the method of this invention, for example, certain desired objects or portions of objects being photographed, may be caused to stand out with much greater definiteness than other objects or portions of objects. As a result, the method and means of this invention are particularly applicable to the production of unusual and fantastic effects and to the production of films which appear to have depth or relief.

Generally stated, the method contemplates the simultaneous recording of two images of a single object on a continuous film provided with two spaced emulsions, the images recorded in one of such emulsions being extremely sharp and critical whereas the images recorded in the other emulsion are diffused.

The method also contemplates means whereby the amount of diffusion or definiteness obtained may be readily controlled without the necessity of using special cameras, projectors, or changing the film. The method of this invention permits a portion of the picture area or a portion of the object being photographed to stand out with unusual definiteness, such result being accomplished by changing the character of the illumination used on the object being photographed.

The film adapted for use in the method of this invention comprises a suitable backing and a layer of emulsion on one face thereof, such layer of emulsion containing an intermediate, translucent layer of material adapted to diffuse the light. The single layer of emulsion, or what may be termed two layers of emulsion spaced by such diffusing, translucent layer, can also contain a dye which acts as a filter, thereby causing the emulsion farthest from the lens of the camera to preferentially record wave lengths longer than the characteristic of the filter or dye.

It is an object of this invention, therefore, to disclose and provide a method of producing monochromatic motion picture film carrying images which give rise to stereoscopic effect when projected.

Another object is to disclose and provide a method of producing monochromatic motion picture film in which the images exhibit relief, roundness or depth.

A further object is to disclose and provide a method whereby any desired object or portion of an object being photographed may be caused to either stand out or merge with the background photographed by simply changing the character of the illumination used on the object during photography.

These and other objects, uses and advantages, as well as modifications and adaptations of the invention, will become apparent to those skilled in the art from the following detailed description of a preferred method of putting the invention into operation.

In describing the invention, reference will be had to the appended drawing, in which Fig. 1 is a diagrammatic plan view illustrating a typical arrangement of elements employed during photography in accordance with this invention.

Fig. 2 is an enlarged longitudinal section through a portion of a negative film utilized during photography.

Fig. 3 is an enlarged longitudinal section showing the relationship between the developed negative film and a positive film during printing.

It has been discovered that the effect of depth or relief may be obtained by utilizing two separated layers of emulsion in a negative film, such layers of emulsion being separated by an intermediate, translucent layer of a material adapted to diffuse light. The intermediate diffusing layer may be extremely thin and as a result, the film may appear to have but a single layer of emulsion thereon, but for purposes of clarity, the film will be hereinafter described as consisting of two separated layers of emulsion so as to permit a more accurate description of the process to be here presented.

The intermediate translucent diffusing layer may consist of starch, such as rice starch, or a finely ground solid or pigment capable of diffusing light. Such intermediate layer may also contain a suitable dye capable of acting as a color filter so as to cause the lower portion of the emulsion or lower emulsion layer to preferentially record wave lengths longer than the characteristic of the filter. The dye may be such as to absorb the shorter wave lengths, such as blue and yellow, so as to permit the lower emulsion to preferentially record wave lengths longer than orange or red. This dye may be carried directly by the starch grains or other diffusing medium. It is to be understood that the intermediate layer of diffusing material need not be very extensive or of any great density or thickness, and when the materials referred to herein are used, the so-called layer of diffusing material is a discontinuously associated, minutely thin layer of particles. This diffusing material is of inappreciable thickness and for this reason the entire film is sufficiently thin to permit its use in ordinary cameras without changes or alterations.

A film of the character mentioned hereinabove is illustrated in Fig. 2, wherein a supporting strip or backing is illustrated at 10. The emulsion comprises the outer layer 11 and the inner layer 12 separated by the intermediate diffusing and/or color filtering layer 13. The emulsions 11 and 12 may be of the same general type, for example of the panchromatic type. Preferably, the emulsion 11 is most sensitive to light of shorter wave lengths whereas the emulsion 12 is most sensitive to the longer wave lengths. The emulsion 11, for example, may be sensitive to light down to the yellow whereas the emulsion 12 may be most sensitive to orange and red.

In utilizing the negative film described hereinabove, the emulsion most sensitive to the shorter wave lengths of light, namely, the emulsion 11, preferably faces the lens and the object being photographed, as indicated in Fig. 1, wherein the lens of the camera is diagrammatically illustrated at 14 and the object at 15. The object may be illuminated in any suitable manner, as by means of the light sources 16 to 19.

The photographing operation is then carried out in the normal manner and two simultaneous images are obtained during every photographic exposure of the film in the camera, one of the images being recorded on the emulsion 11 and the other on the emulsion 12. During photography, the image of the object is preferably focused on the front emulsion 11. The light passing through this emulsion and through the diffusing layer 13 produces a diffused image in the emulsion 12. During photography, the amount of diffusion, the intensity or definition of the image, and the effect of relief is controlled by varying the character of the illumination used on the object 15. If, for example, the light sources 16 to 19 inclusive uniformly illuminate both the object and the background with light of all wave lengths, including both the blue and the red, then the background image recorded in the emulsion 12 will be but slightly diffused and no particular effect of relief will be obtained in the final composite image recorded on the emulsions 11 and 12. If, on the other hand, the entire background, including the object 15, is illuminated with light of wave length shorter than orange, such as blue light, and the object 15 is then additionally illuminated with light from a spot-light provided with a red color filter so as to have the object illuminated with both blue and red light, then the background will be slightly diffused whereas the object 15 will show a certain amount of relief. In order to accentuate this relief or accentuate the definition or distinctness of the object 15 with relation to the background, the entire scene, including background and object, may be illuminated with red light but the object 15 may in addition be illuminated with blue light. Under these conditions, the background (not illuminated with blue) will be very appreciably diffused whereas the object 15 will stand out with startling clearness and definition.

By careful control of lights as by the use of masks or spot-lights provided with masks, the images of portions of the objects being photographed may be caused to become much more definite than others so that the attention of a person observing the projected images may be instantly drawn to a particular portion of the scene. In this manner, films of fantasy may be readily produced without the use of duping, double printing, double exposure, or other methods of producing unusual or fantastic effects. Certain objects may be caused to become diffused and ghostly (in the projected image) by the regulation of the light during photography.

The exposed negative film obtained as above described may then be developed in the normal manner, it being remembered that the two emulsions 11 and 12 preferably have the same developing characteristics. After washing and drying, the negative film may be printed upon a normal single-coated positive film in the manner illustrated in Fig. 3. As there shown, the now developed negative film (component parts of which being represented by the same numbers as those used in Fig. 2) is brought in contact with a positive film 20, the emulsion 11 bearing the sharp or critical image being brought in contact with the emulsion of the positive film 20. The printing light is passed through the two films in the direction indicated by the arrow, whereupon both the sharp image of emulsion 11 and the diffused image of emulsion 12 are simultaneously printed upon the positive. Upon developing the positive film and projecting the same in the normal manner, it will be found that the projected images exhibit relief or depth which strikingly simulates true stereoscopic relief, provided the character of the lights used during photography has been varied in accordance with the description given hereinabove.

It is to be understood that the translucent light-diffusing layer 13 is not of a density sufficient to prevent printing of the recorded images upon a positive. The layer should be sufficiently permeable to light to permit printing, even though some increase in light intensity over that normally employed may have to be used. Furthermore, although a specific form of the invention has been described hereinabove, numerous changes and modifications may be made without departing from the scope of the invention described herein. The translucent light-diffusing layer may be embodied in the carrier strip of the film, the emulsion then being positioned on either side of the carrier.

All such changes and modifications as come within the scope of the appended claims are embraced thereby.

I claim:

1. A film for use in making monochromatic negatives, the prints of which are adapted to create the effect of depth, comprising: a carrier strip provided with two closely adjacent emulsions on one side of the carrier strip, both of said emulsions being of the panchromatic type, said emulsions being separated by a thin layer of translucent material adapted to diffuse light, said layer being sufficiently permeable to light to permit printing, said layer of translucent material including a dye adapted to substantially prevent one of said emulsions from recording a portion of the spectrum to which the other emulsion is sensitive.

2. A film for use in making monochromatic negatives, the prints of which are adapted to create the effect of depth, comprising: a single carrier strip provided with two closely adjacent emulsions on one side of said carrier strip, both of said emulsions being of panchromatic type, and a thin dispersion of very finely divided material between said emulsions, said thin dispersion being translucent sufficiently to permit printing but adapted to diffuse light passing therethrough, said finely divided material including a dye adapted to substantially prevent one of said emulsions from recording a portion of the spectrum to which the other emulsion is sensitive, whereby said film is adapted to form a sharp image in one of said emulsions and a diffused image in the other of said emulsions.

CHARLES B. DREYER.